United States Patent

Cseri

Patent Number: 5,330,140
Date of Patent: Jul. 19, 1994

[54] PIPE ANCHOR

[75] Inventor: Zoltan Cseri, Northbrook, Ill.

[73] Assignee: P.E.P. Industries, Ltd., Bedford Park, Ill.

[21] Appl. No.: 998,478

[22] Filed: Dec. 30, 1992

[51] Int. Cl.⁵ .............................. F16L 3/08
[52] U.S. Cl. ........................ 248/74.2; 284/74.5
[58] Field of Search .......... 248/65, 74.1, 74.2, 248/74.4, 74.5, 221.3

[56] References Cited

U.S. PATENT DOCUMENTS

| | | | |
|---|---|---|---|
| 2,546,792 | 3/1951 | Smith et al. | 248/67 |
| 4,222,538 | 9/1980 | Jensen et al. | 248/74.4 |
| 5,048,776 | 9/1991 | Weiss | 248/74.4 |
| 5,088,672 | 2/1992 | Neuendorf et al. | 248/74.4 |
| 5,118,215 | 6/1992 | Freier | 248/74.4 |

Primary Examiner—Richard K. Seidel
Assistant Examiner—Hwei-Siu Payer
Attorney, Agent, or Firm—Juettner Pyle Lloyd & Piontek

[57] ABSTRACT

A pipe anchor to support the air lines of a railway car is made up of two substantially identical components. One of the components is welded to the car, and the other mobile component is brought into locking engagement around the pipe. Each component has a pair of opposed inclined legs. The mobile component is inverted relative to the other, and the legs slidably engage into a locked position embracing the pipe.

6 Claims, 2 Drawing Sheets

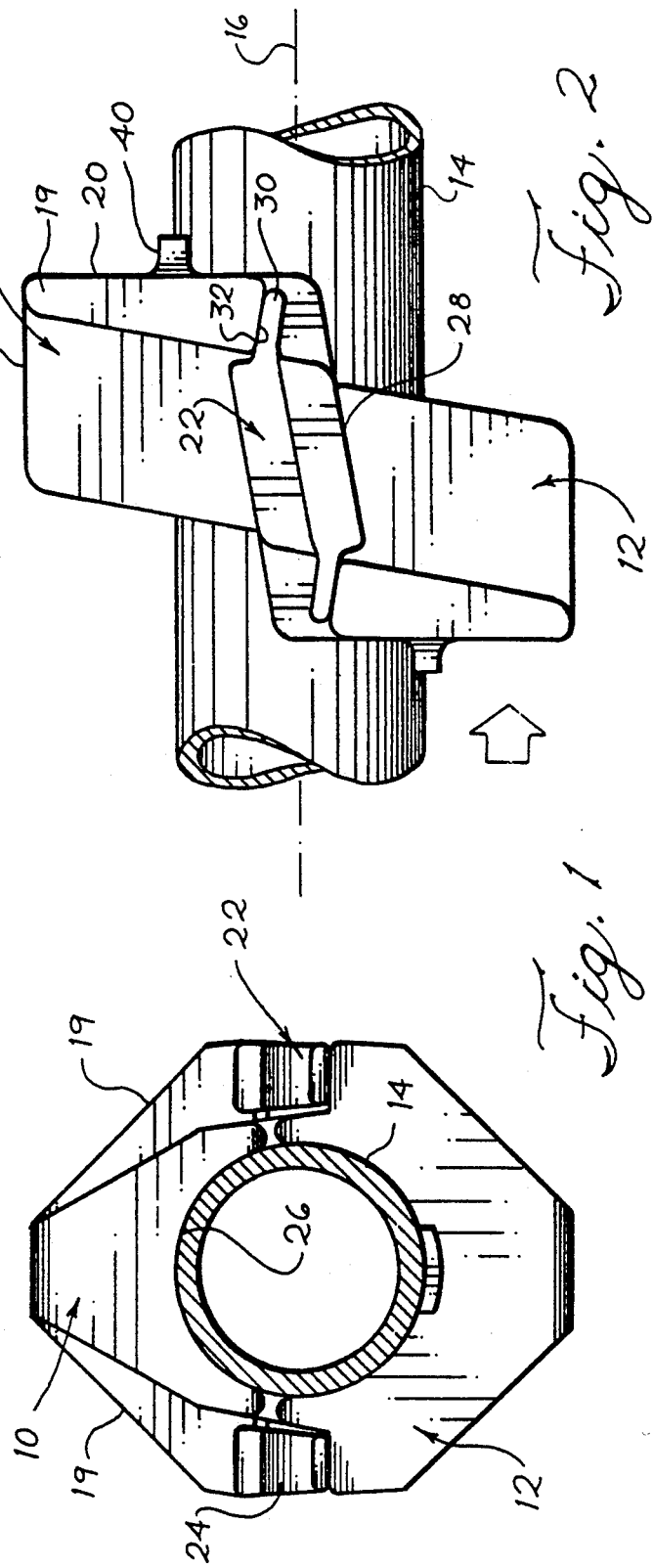
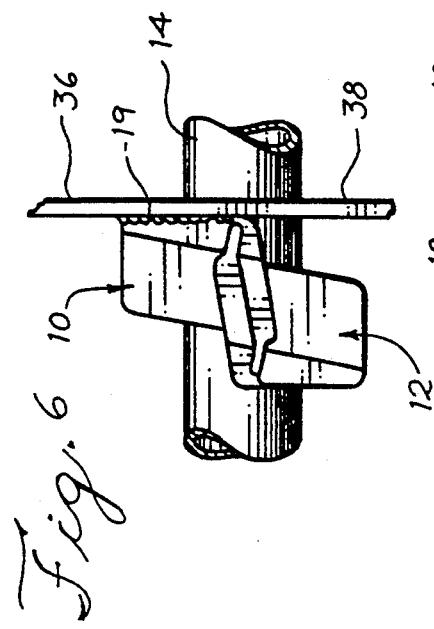
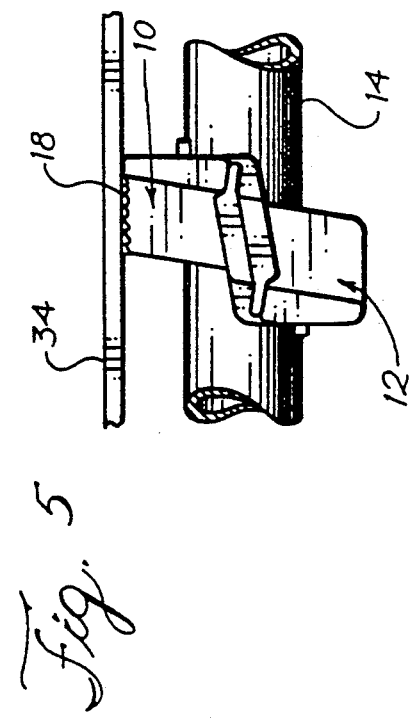

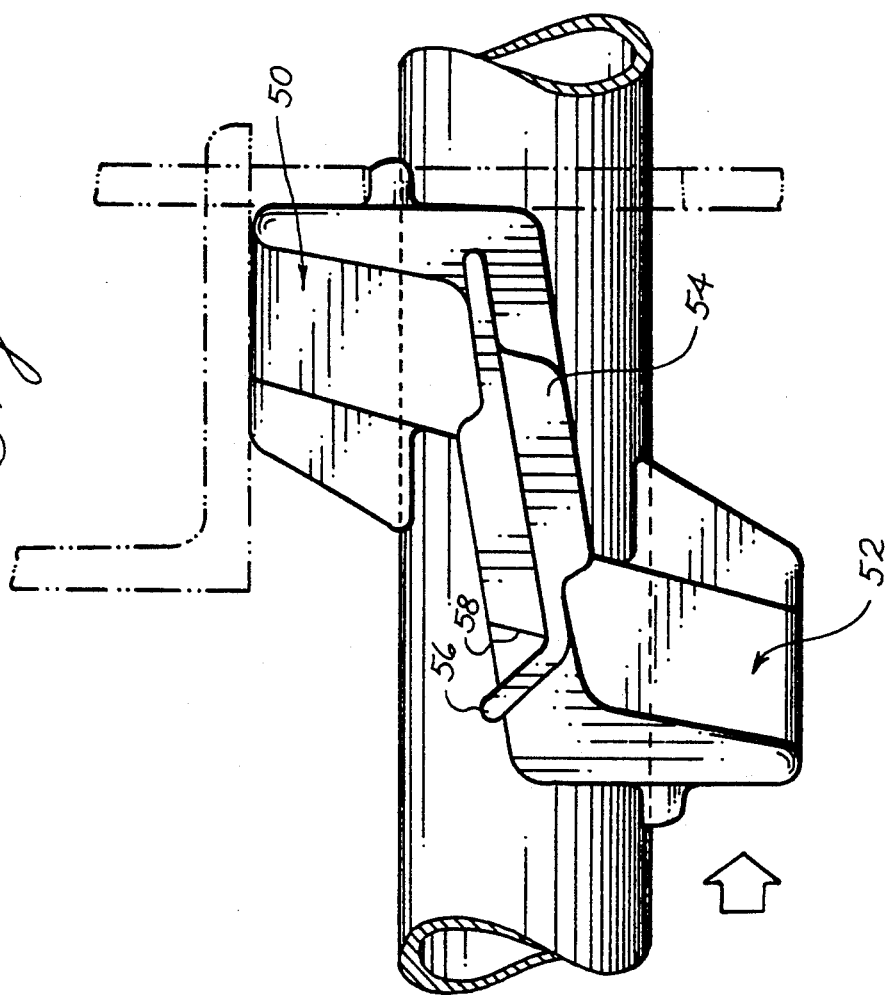
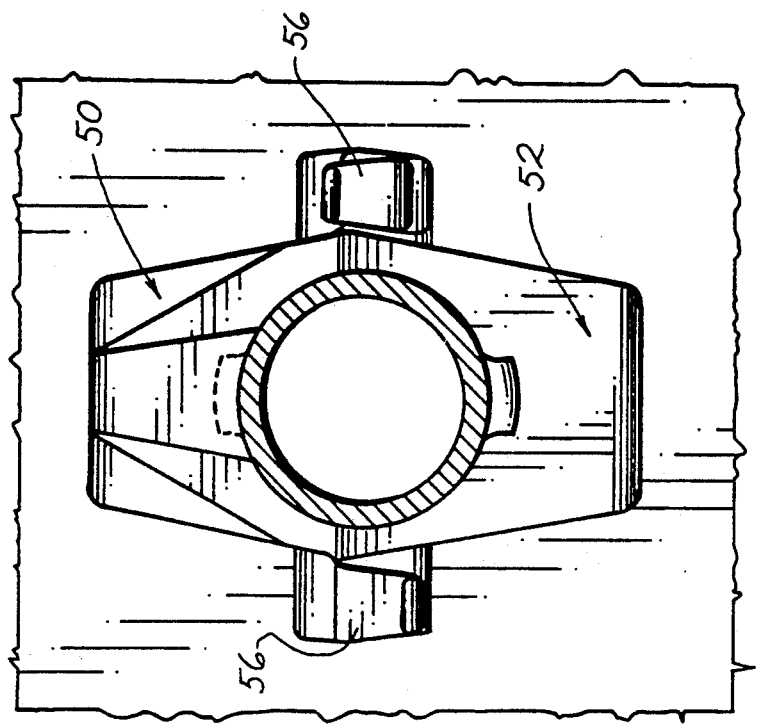

PIPE ANCHOR

BACKGROUND OF THE INVENTION

This invention relates to pipe anchors used on railway cars, which are used to secure air lines to the car body and prevent vibration.

Representative pipe anchors are shown in U.S. Pat. Nos. 2,546,792 and 4,222,538 and in references cited therein. These pipe anchors have included two or more parts, one of which is welded to the car body. The other part or parts are then secured around the pipe and locked in position. In U.S. Pat. No. 2,546,792, the part secured to the car has a recess on one side and a locking tab on the other side. The mobile part has a wedge on one side which is driven into engagement with the recess, and an opening on the other side to receive a tab.

SUMMARY OF THE INVENTION

An object of the present invention is to provide a railway pipe anchor which is durable and easy and convenient to use and install.

Another object of the invention is to provide a pipe anchor consisting of a pair of substantially identical parts, which may be used interchangeably, thus avoiding the necessity of separate inventories of each part.

In accordance with the present invention, each part of the pipe anchor comprises a head portion with an elongated open concave semi-cylindrical cavity around a central pipe axis. The head has a vertical surface and a horizontal surface for welding one of the parts to a horizontal or vertical surface on the railway car. A pair of side legs extend from the head on an angle outwardly from the head and away from the pipe axis and outside the circumference of the pipe. The ends of the legs may be self locking against the other part or may be manually locking.

The two components are used with one component inverted relative to the other, with the concave surfaces in opposition and the legs from one part overlapping the legs of the other. One part has been previously secured to the car, and the mobile or free part is slid into engagement with the fixed part, with the pipe and legs acting as alignment guides. As the mobile part starts to grip the pipe, a hammer may be employed to complete the joinder. The ends of the legs either self lock on an inclined surface of the other part, or extend beyond a shoulder and are bendable to a locked position.

THE DRAWINGS

FIG. 1 is an end view of a first embodiment of the pipe anchor of the present invention.

FIG. 2 is a side view of the embodiment shown in FIG. 1.

FIG. 3 is an end view of a second embodiment of the pipe anchor of the present invention.

FIG. 4 is a side view of the embodiment shown in FIG. 3.

FIGS. 5 and 6 are side views illustrating securement of the FIG. 1 embodiment to the car structure.

DESCRIPTION OF THE PREFERRED EMBODIMENTS

FIGS. 1 and 2 illustrate a pair of substantially identical pipe anchor components 10 and 12, one of which is welded to a car support structure, with the other being in a locked interengaged relation with the first, with the two members extending around and engaging a pipe or air line 14 having a central axis 16. Since the two interfitting parts are substantially identical, only one of the parts will be described in detail.

Each part comprises an enlarged head portion having a planar surface 18 extending parallel to the pipe axis 16 and a planar end surface 20 extending at right angles to axis 16 and joined with surface 18. As will be described in more detail, the purpose of these surfaces is to enable welding of one of the parts to a horizontal or vertical support structure. In addition, each unit may include side surfaces 19 diverging outwardly at forty-five degrees from the wall 18.

The head of each component has a pair of substantially identical lateral opposed legs 22 and 24 extending forwardly from the vertical end wall 20, with the opposed legs sloping at identical acute angles outwardly and away from the pipe axis 16. The head portion of each member also has an elongated outwardly facing semi-cylindrical cavity 26 having a radius substantially the same as the radius of the pipe 14.

The surfaces 28 of the legs generally facing the cavity 26 are substantially coplanar and preferably flat and serve as guide surfaces as the two components 10 and 12 are being engaged and support surfaces after the components are locked together. Each leg terminates in a flexible tab 30 adapted to deflect and resiliently engage a sloped shoulder surface 32 of the other member 10. Prior to installation, the tab 30 is coplanar with the remainder of the leg 22 and extends at an acute angle with axis 16. The shoulder 32 extends at an acute angle in the other direction, causing the tabs of all four legs to deflect and hold the assembly together.

FIG. 5 shows application of the pipe anchor to a horizontal surface or wall 34 of a railway vehicle. The surface 18 of one component 10 is supported against the wall 34 and is welded around the wall.

FIG. 6 shows installation of the pipe and pipe anchor assembly through a vertical support member 36 having an opening 38 larger than the circumference of the pipe 14. An arcuate lug 40 protrudes from the end wall around a portion of the semi-circular end opening of the cavity and serves to position the component during the welding procedure. The wall 20 is brought into engagement with the wall 36, with the arcuate lug 40 engaged with the rim of the opening 38. This assures that the pipe will not contact the rim of the opening after it has been secured by welding.

Although not shown, it is clearly apparent that the side walls 19 may be used to support and weld a component in a corner location. Thus, means are provided for welding an anchor component to any type of surface normally encountered in a railway vehicle.

The components 10 and 12 are preferably composed of steel and are preferably fabricated by forging. This allows the components to be durable and resilient.

It may be seen that after one component 10 is affixed to the support structure, the pipe 14 is placed against the cavity 26, and the second component, in an inverted position, is forced into locking engagement with the first. During the installation step, the legs 22 of member 12 are in overlapping relationship, with the respective flat surfaces 28 in contact at opposite sides. Thus, the legs 22 and the pipe 14 guide the movement of the second member 12 as it is moved axially toward the first. As the components come into engagement and the tabs 30 start to lock, the pipe comes into contact with the cavity walls of the components, and normally it will be necessary to complete the engagement by striking a hammer against the end wall 20 of the mobile member 12. It may be seen that as the component 12 moves toward the component 10, the components come closer together due to the sloping guide surfaces 28 of the legs.

FIGS. 3 and 4 show another embodiment in which the two components 50 and 52 are substantially identical to the components described in the previous embodiment and will not be described in detail. In this embodiment, each leg 54 on a component 50 is provided with an elongate tab 56 adapted to be bent around a shoulder 58 on the other component to provide a manual lock after assembly.

I claim:

1. A pipe anchor for securing a pipe to a support structure comprising a pair of components adapted to interengage in a closed position with each other around a pipe having an axis, each of components comprising a head having an open cavity surface and an outer surface, said cavity surface extending partially around half said axis for supporting a portion of said pipe, a pair of spaced legs extending from the outer surface of said head, said legs having coplanar ramp surfaces extending at an angle toward said axis, the ramp surfaces of the legs of one component in inverted position relative to the other component being slidably engageable with the ramp surfaces of respective legs of the other component to embrace the pipe when the components are moved toward each other to a closed position, and locking means near the ends of the legs for locking the components in a closed position.

2. The pipe anchor of claim 1 wherein the means for locking the components comprises a resilient tab at the end of a leg of one component, and shoulder on said other component extending at an angle to said tab for resilient locking therewith.

3. The pipe anchor of claim 1 wherein the means for locking the components comprises a manually bendable tab at the end of a leg of one component and a shoulder on the other component around which the tab may be bent.

4. The pipe anchor of claim 1 wherein said head additionally comprises a welding support surface parallel to the axis of the pipe.

5. The pipe anchor of claim 1 wherein said head additionally comprises a welding support surface perpendicular to the axis of said pipe.

6. The pipe anchor of claim 1 wherein said open cavity surface is semi-cylindrical and has a radius substantially the same as the pipe.

* * * * *